US008995408B2

(12) United States Patent
Sato et al.

(10) Patent No.: US 8,995,408 B2
(45) Date of Patent: Mar. 31, 2015

(54) WIRELESS BASE STATION AND WIRELESS COMMUNICATION METHOD

(75) Inventors: Yoshizo Sato, Daito (JP); Masaaki Nakata, Yamato (JP); Nobuaki Takamatsu, Koto-ku (JP); Masahiro Yagi, Kawasaki (JP); Hiroki Fujita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/814,495

(22) PCT Filed: Aug. 5, 2011
(Under 37 CFR 1.47)

(86) PCT No.: PCT/JP2011/067945
§ 371 (c)(1),
(2), (4) Date: Mar. 19, 2013

(87) PCT Pub. No.: WO2012/018113
PCT Pub. Date: Feb. 9, 2012

(65) Prior Publication Data
US 2013/0176977 A1 Jul. 11, 2013

(30) Foreign Application Priority Data
Aug. 6, 2010 (JP) ................................. 2010-178160

(51) Int. Cl.
*H04J 3/00* (2006.01)
*H04W 72/04* (2009.01)
(Continued)

(52) U.S. Cl.
CPC ............ *H04W 72/042* (2013.01); *H04W 88/08* (2013.01); *H04L 5/00* (2013.01)
USPC ............................. 370/336; 370/280; 370/329

(58) Field of Classification Search
CPC .......... H04B 7/06; H04L 1/00; H04L 1/1812; H04L 5/0051; H04L 5/0053; H04L 25/0224; H04L 1/16; H04W 16/28; H04W 72/042; H04W 28/04; H04W 72/08; H04W 72/085; H04W 72/046

USPC ......... 370/252, 280, 294, 329, 330, 328, 278, 370/336–338, 491, 500; 342/174
See application file for complete search history.

(56) References Cited

U.S. PATENT DOCUMENTS

2008/0198066 A1* 8/2008 Kang et al. .................... 342/174
2009/0180435 A1* 7/2009 Sarkar .......................... 370/330
(Continued)

FOREIGN PATENT DOCUMENTS

JP 2009-253910 A 10/2009
WO 2008/093952 A2 8/2008
(Continued)

OTHER PUBLICATIONS

Maria Djanatliev, LTE TDD Technology Overview, Rohd & Schwarz, Jun. 2009, 13 Pages.*
(Continued)

*Primary Examiner* — Edan Orgad
*Assistant Examiner* — Ivan O Latorre
(74) *Attorney, Agent, or Firm* — Procopio, Cory, Hargreaves & Savitch LLP

(57) ABSTRACT

A resource determination unit determines at least a part of an uplink part in a switch subframe as a second resource for a wireless terminal to transmit an SRS and determines at least a part within any uplink subframe as a third resource for the wireless terminal to transmit uplink user data including a DRS for a prescribed period. A transmission path state estimation unit estimates a state of a transmission path to the wireless terminal based on the DRS included in the uplink user data after the third resource is determined. A resource notification unit forms antenna directivity based on the estimated state of the transmission path and transmits a control message for notifying the wireless terminal of the determined second resource.

6 Claims, 8 Drawing Sheets

(51) Int. Cl.
*H04L 5/00* (2006.01)
*H04W 88/08* (2009.01)

(56) References Cited

U.S. PATENT DOCUMENTS

| | | | | |
|---|---|---|---|---|
| 2009/0323664 | A1* | 12/2009 | Li et al. | 370/344 |
| 2010/0069028 | A1 | 3/2010 | Choi et al. | |
| 2010/0150114 | A1* | 6/2010 | Che | 370/336 |
| 2010/0238824 | A1* | 9/2010 | Farajidana et al. | 370/252 |
| 2011/0013546 | A1* | 1/2011 | Hao et al. | 370/294 |
| 2011/0058505 | A1* | 3/2011 | Pan et al. | 370/280 |
| 2011/0141952 | A1* | 6/2011 | Wang et al. | 370/294 |
| 2011/0176443 | A1* | 7/2011 | Astely et al. | 370/252 |
| 2012/0113875 | A1* | 5/2012 | Alanara et al. | 370/280 |

FOREIGN PATENT DOCUMENTS

| | | | | |
|---|---|---|---|---|
| WO | WO2009/059555 | * | 5/2009 | H04B 7/005 |
| WO | 2009/087182 A2 | | 7/2009 | |

OTHER PUBLICATIONS

3GPP TS 36.211 V9.1.0 (Technical Specification), 3rd Generation Partnership Project; Technical Specification Group Radio Access Network; Evolved Universal Terrestrial Radio Access (E-UTRA); Physical Channels and Modulation (Release 9), (Mar. 2010), 85 Pages.*

International Search Report dated Nov. 8, 2011, issued for International Application No. PCT/JP2011/067945.

* cited by examiner

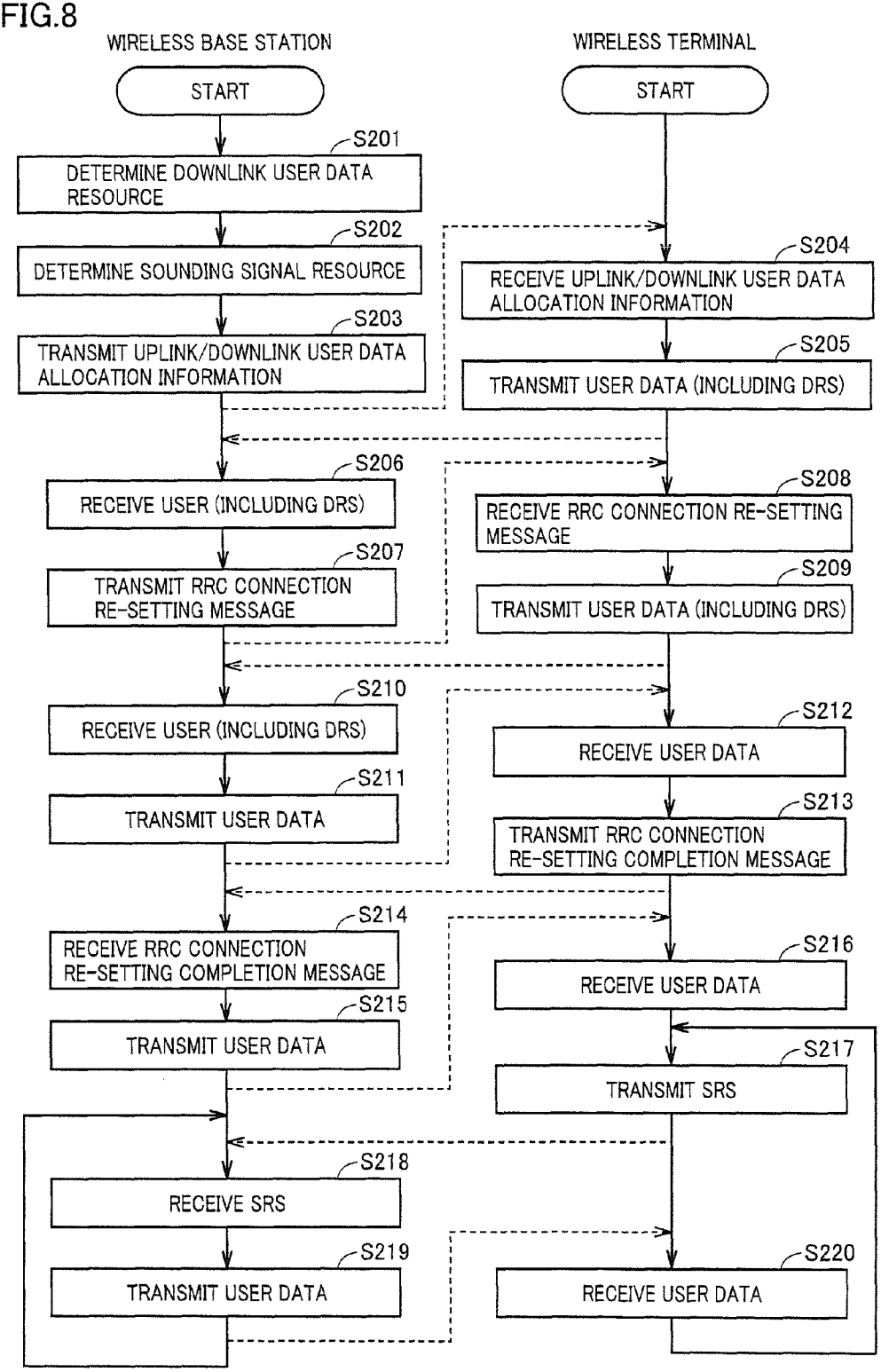

WIRELESS BASE STATION AND WIRELESS COMMUNICATION METHOD

TECHNICAL FIELD

This invention relates to a wireless base station and a wireless communication method, and more particularly to a wireless base station estimating a transmission path based on a reference signal and a wireless communication method.

BACKGROUND ART

In a wireless communication system adapted to an LTE scheme or the like, of which specifications have been developed in 3GPP (3rd Generation Partnership Project), a wireless terminal transmits a reference signal to a wireless base station. The wireless base station estimates a state of a transmission path based on the received reference signal and forms antenna directivity for downlink user data based on the estimated state of the transmission path.

A method of transmitting a reference signal includes such a method that a wireless terminal transmits a DRS (Demodulation Reference Signal) embedded in uplink user data and such a method that a wireless terminal transmits an SRS (Sounding Reference Signal) through an UpPTS (uplink part) in a switch subframe.

CITATION LIST

Patent Literature

PTL 1: Japanese Patent Laying-Open No. 2009-253910

SUMMARY OF INVENTION

Technical Problem

The method of transmitting a DRS as a reference signal is advantageous in that a time period from determination of a wireless resource from which a wireless base station transmits downlink user data until actual transmission of the downlink user data by the wireless base station with the use of that wireless resource is short. There is a case, however, that a valuable wireless resource which can be used for transmission of uplink user data in all wireless terminals is used only for transmission of a DRS and waste of a wireless resource gives rise to a problem.

Meanwhile, in a method of transmitting an SRS as a reference signal, since an SRS is not transmitted as being embedded in uplink user data, waste of the wireless resource can be avoided. In order for a wireless terminal to transmit an SRS, however, initially, a control message for an SRS transmission/stop command should be transmitted from a wireless base station to the wireless terminal. Namely, in response to reception by the wireless terminal, of the control message transmitted from the wireless base station, the wireless terminal transmits an SRS. Therefore, a wireless base station side has not yet successfully estimated a state of a transmission path at the time of transmission of the control message, and consequently a smart antenna technique cannot be applied to transmission of the control message. Thus, in such an environment that interference between users is great in a downlink, an error may be caused in transmission and reception of a control message.

Solution to Problem

According to one aspect of the present invention, a wireless base station includes a resource determination unit for determining at least a part within any downlink subframe as a first resource for transmitting downlink user data to a wireless terminal, determining at least a part of an uplink part within a switch subframe or a part of an uplink subframe as a second resource for the wireless terminal to periodically transmit a first reference signal, and determining at least a part within any uplink subframe as a third resource for the wireless terminal to transmit uplink user data including a second reference signal for a prescribed period, a resource notification unit for notifying the wireless terminal of the determined third resource, and a transmission path state estimation unit for estimating a state of a transmission path to the wireless terminal based on the second reference signal included in the received uplink user data when the uplink user data including the second reference signal is received through the third resource from the wireless terminal. The resource notification unit forms directivity of an antenna based on the estimated state of the transmission path and transmits through the first resource, a control message for notifying the wireless terminal of the determined second resource.

According to another aspect of the present invention, a wireless communication method includes the steps of determining at least a part within any downlink subframe as a first resource for transmitting downlink user data to a wireless terminal, determining at least a part of an uplink part within a switch subframe or a part of an uplink subframe as a second resource for the wireless terminal to periodically transmit a first reference signal, and determining at least a part within any uplink subframe as a third resource for the wireless terminal to transmit uplink user data including a second reference signal for a prescribed period, notifying the wireless terminal of the determined third resource, and estimating a state of a transmission path to the wireless terminal based on the second reference signal included in the received uplink user data when the uplink user data including the second reference signal is received through the third resource from the wireless terminal. In the notifying step, directivity of an antenna is formed based on the estimated state of the transmission path and a control message for notifying the wireless terminal of the determined second resource is transmitted through the first resource.

BRIEF DESCRIPTION OF DRAWINGS

FIG. 8 is a flowchart showing an operation procedure in a wireless communication system in a variation of the embodiment.

DESCRIPTION OF EMBODIMENTS

Figure 1:
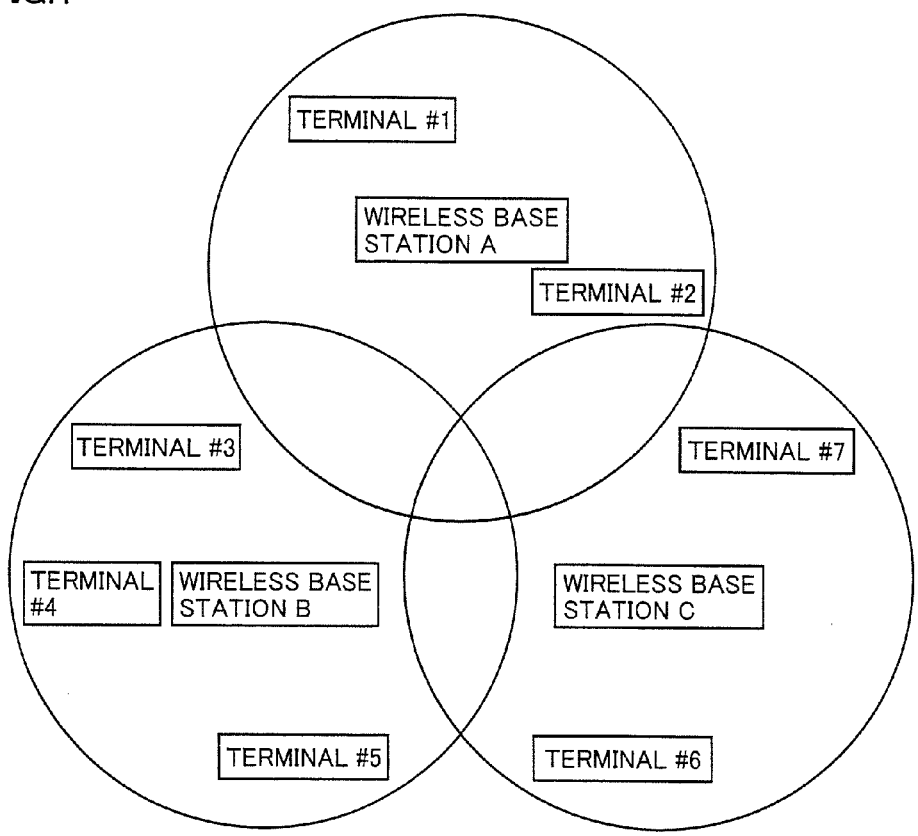
FIG. 1 is a diagram showing a configuration of a wireless communication system in an embodiment.

An embodiment will be described hereinafter in detail with reference to the drawings. It is noted that the same or corresponding elements in the drawings have the same reference characters allotted and description thereof will not be repeated.

Configuration of Wireless Communication System

FIG. 1 is a diagram showing a configuration of a wireless communication system in an embodiment.

Referring to FIG. 1, this wireless communication system is a communication system adapted to an LTE (Long Term Evolution) scheme, in which a plurality of wireless base stations A, B, C communicate with wireless terminals within their zones shown with circles in the figure, respectively. These wireless base stations A, B, C receive uplink signals and transmit downlink signals at the same timing.

Configuration of Wireless Base Station

Figure 2:
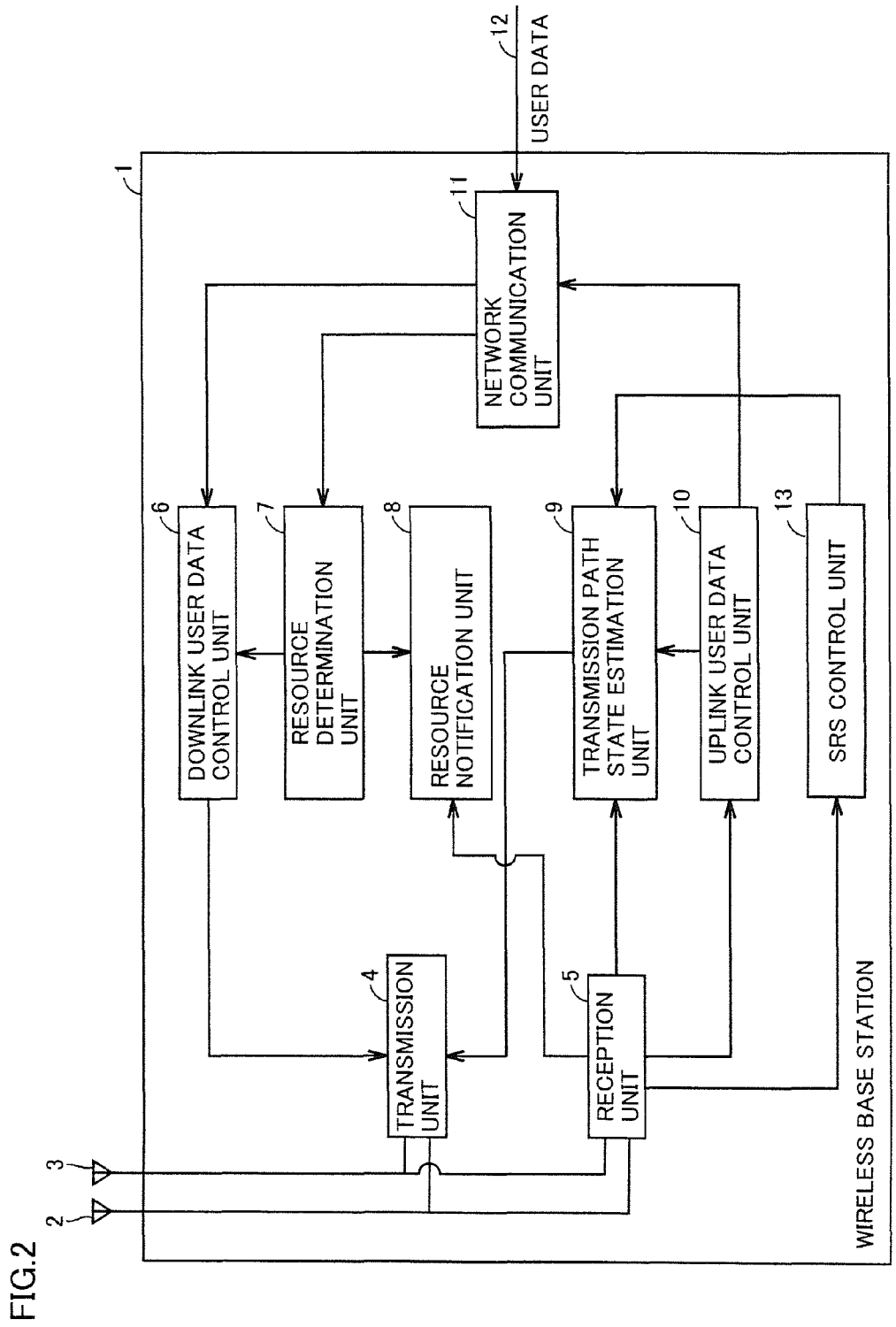
FIG. 2 is a diagram showing a configuration of a wireless base station in the embodiment.

FIG. 2 is a diagram showing a wireless base station in the embodiment.

Referring to FIG. 2, this wireless base station 1 includes a plurality of antennas 2, 3, a transmission unit 4, a reception unit 5, a downlink user data control unit 6, an uplink user data control unit 10, an SRS control unit 13, a resource determination unit 7, a resource notification unit 8, a transmission path state estimation unit 9, and a network communication unit 11.

Transmission unit 4 transmits downlink user data and a control signal such as an RRC (Radio Resource Control) connection re-setting message or an uplink user data/downlink user data allocation message to a wireless terminal through the plurality of antennas 2, 3. Transmission unit 4 forms directivity of the plurality of antennas 2, 3 based on a state of a transmission path for each sub carrier estimated by transmission path state estimation unit 9 and transmits downlink user data. For example, transmission unit 4 subjects downlink user data to adaptive array transmission processing (weight processing) in accordance with a state of a transmission path and forms directivity of antenna 2, 3. Here, formation of antenna directivity includes beam forming for directing beams (a portion intensely receiving/transmitting a signal) to a desired communication counterpart and null steering for directing null (a portion substantially not receiving/transmitting a signal) in an unwanted signal source direction or in a direction in which interference is not desirably effected.

Reception unit 5 receives uplink user data and a control signal including an SRS, an RRC connection re-setting completion message, and the like from a wireless terminal through the plurality of antennas 2, 3.

Downlink user data control unit 6 holds downlink user data received from a not-shown control center through network communication unit 11.

Uplink user data control unit 10 transmits uplink user data received from a wireless terminal to the not-shown control center through network communication unit 11. In addition, uplink user data control unit 10 outputs a DRS included in the received uplink user data to transmission path state estimation unit 9.

SRS control unit 13 outputs the SRS received from the wireless terminal to transmission path state estimation unit 9.

When downlink user data control unit 6 receives downlink user data, resource determination unit 7 determines at least a part within any downlink subframe DL as a "first resource" for periodically transmitting downlink user data to a wireless terminal. Resource determination unit 7 determines a part of an UpPTS (uplink part) within a switch subframe as a "second resource" for a wireless terminal to periodically transmit an SRS. Resource determination unit 7 determines at least a part within any uplink subframe UL as a "third resource" for periodically transmitting uplink user data including a DRS for a prescribed period.

Resource notification unit 8 transmits uplink user data/downlink user data allocation information representing the determined first resource and third resource to a wireless terminal. Resource notification unit 8 transmits an RRC connection re-setting message representing the determined second resource to the wireless terminal. Resource notification unit 8 receives an RRC connection re-setting completion message from the wireless terminal.

Transmission path state estimation unit 9 estimates a state of a transmission path based on an SRS or a DRS.

Network communication unit 11 receives downlink user data from a control center through a network 12. Network communication unit 11 transmits uplink user data to the control center through network 12.

Configuration of Wireless Terminal

Figure 3:
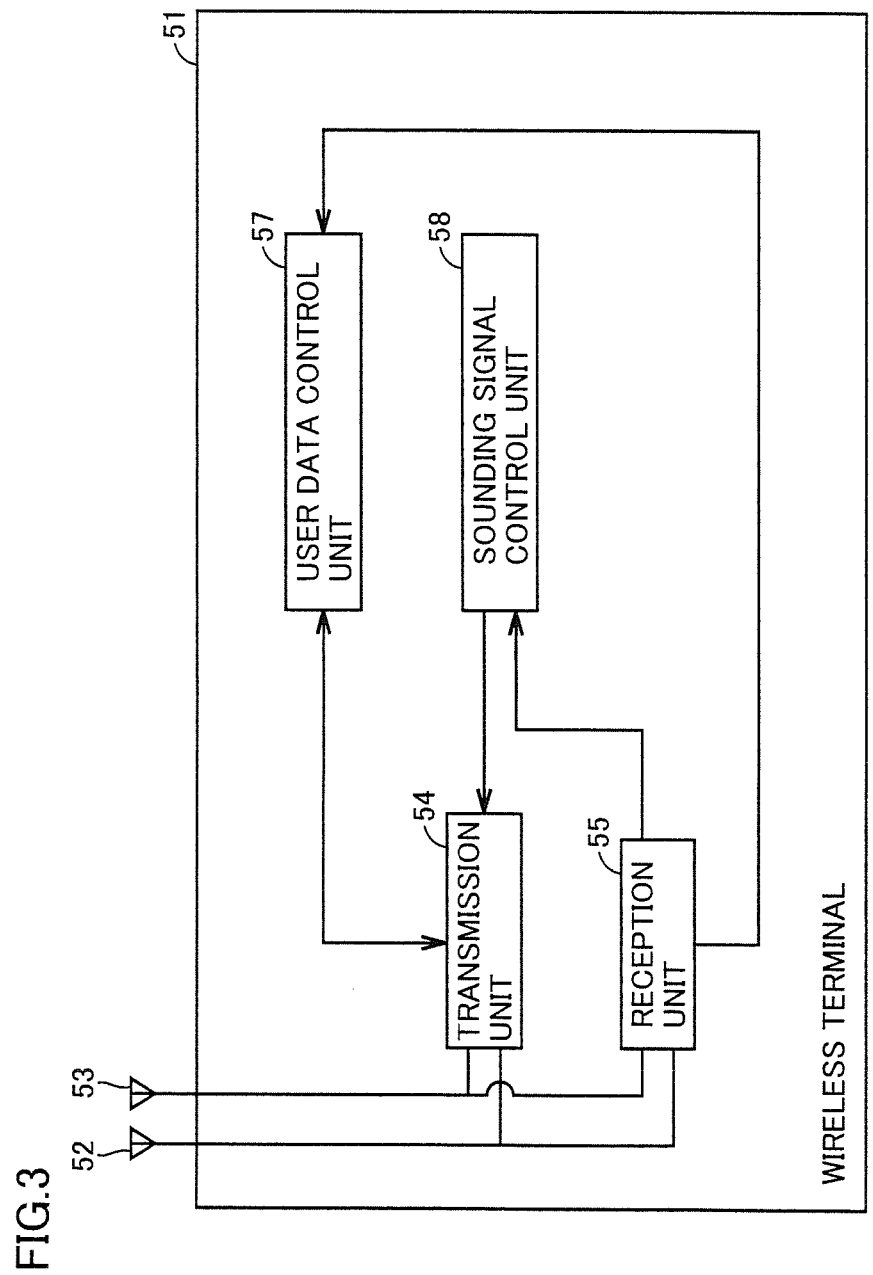
FIG. 3 is a diagram showing a configuration of a wireless terminal in the embodiment.

FIG. 3 is a diagram showing a configuration of a wireless terminal in the embodiment.

Referring to FIG. 3, this wireless terminal 51 includes a plurality of antennas 52, 53, a transmission unit 54, a reception unit 55, a user data control unit 57, and a sounding signal control unit 58.

Reception unit 55 receives downlink user data and a control signal such as an RRC connection re-setting message through the plurality of antennas 52, 53.

Transmission unit 54 transmits uplink user data and a control signal such as an SRS and an RRC connection re-setting completion message to wireless base station 1 through the plurality of antennas 52, 53.

User data control unit 57 holds and controls downlink user data received from wireless base station 1 and uplink user data to be transmitted to wireless base station 1.

When sounding signal control unit 58 receives an RRC connection re-setting message, sounding signal control unit 58 allocates a wireless resource from which an SRS is to be transmitted, based on the RRC connection re-setting message. Thereafter, sounding signal control unit 58 transmits an RRC connection re-setting completion message. Sounding signal control unit 58 transmits an SRS by using the allocated wireless resource.

Configuration of Frame

Figure 4:
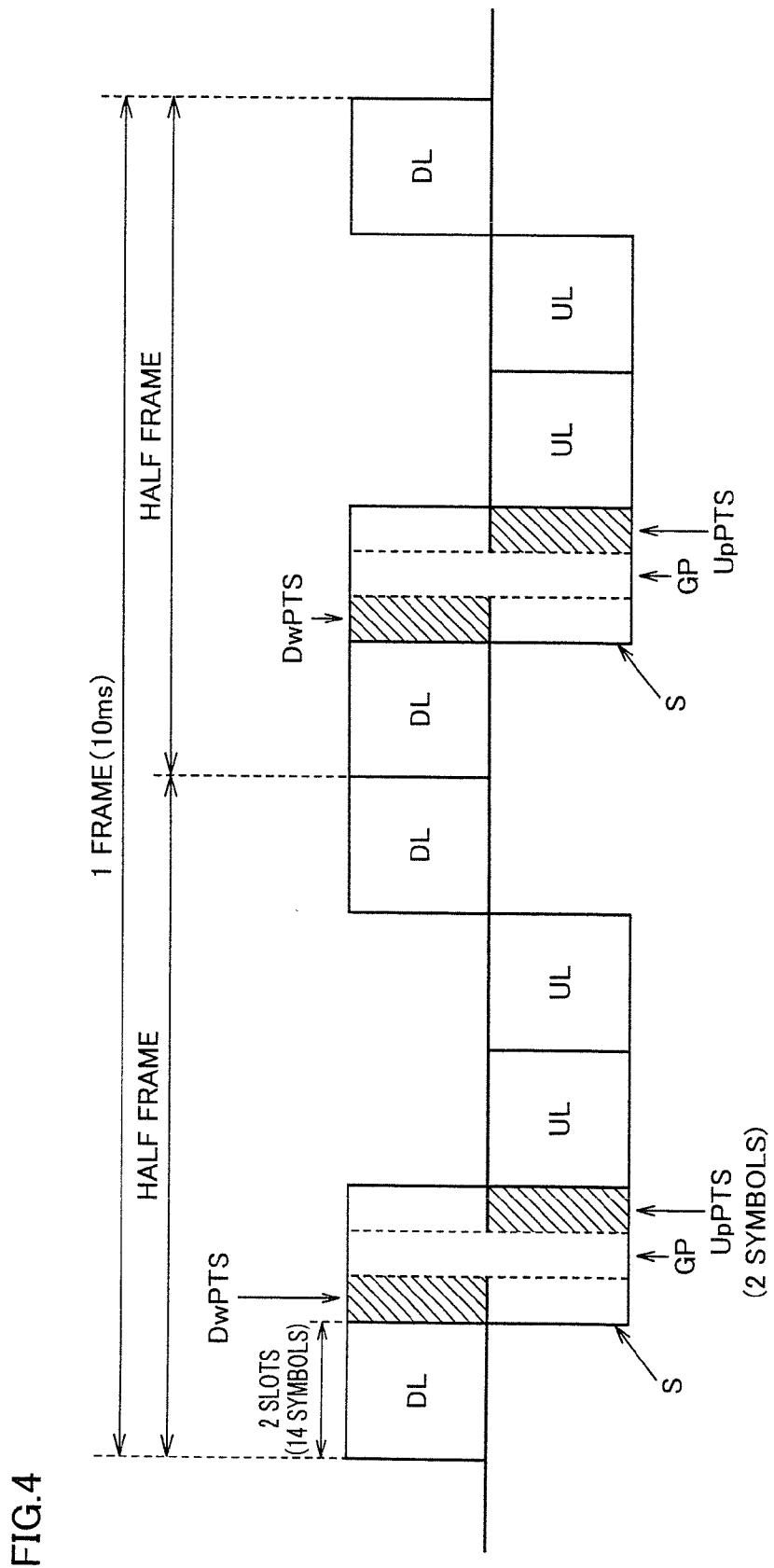
FIG. 4 is a diagram showing a configuration of a frame transmitted in the wireless communication system to the embodiment.

FIG. 4 is a diagram showing a configuration of a frame transmitted in the wireless communication system in the embodiment.

Referring to FIG. 4, a configuration of this frame is a configuration at the time when an (Uplink-downlink configuration) in the LTE is set to "1".

As shown in FIG. 4, one frame is transmitted in a time period of 10 ms. One frame is divided into half frames. Each half frame is formed, in time sequence, of a downlink subframe DL, a switch subframe S, two consecutive uplink subframes UL, and a downlink subframe DL.

Here, switch subframe S is formed of a DwPTS (Downlink Pilot Timeslot), a GP (Guard Period), and an UpPTS (Uplink Pilot Timeslot; also referred to as an uplink part). The UpPTS is formed of 2 symbols.

Processing Timing

Figure 5:
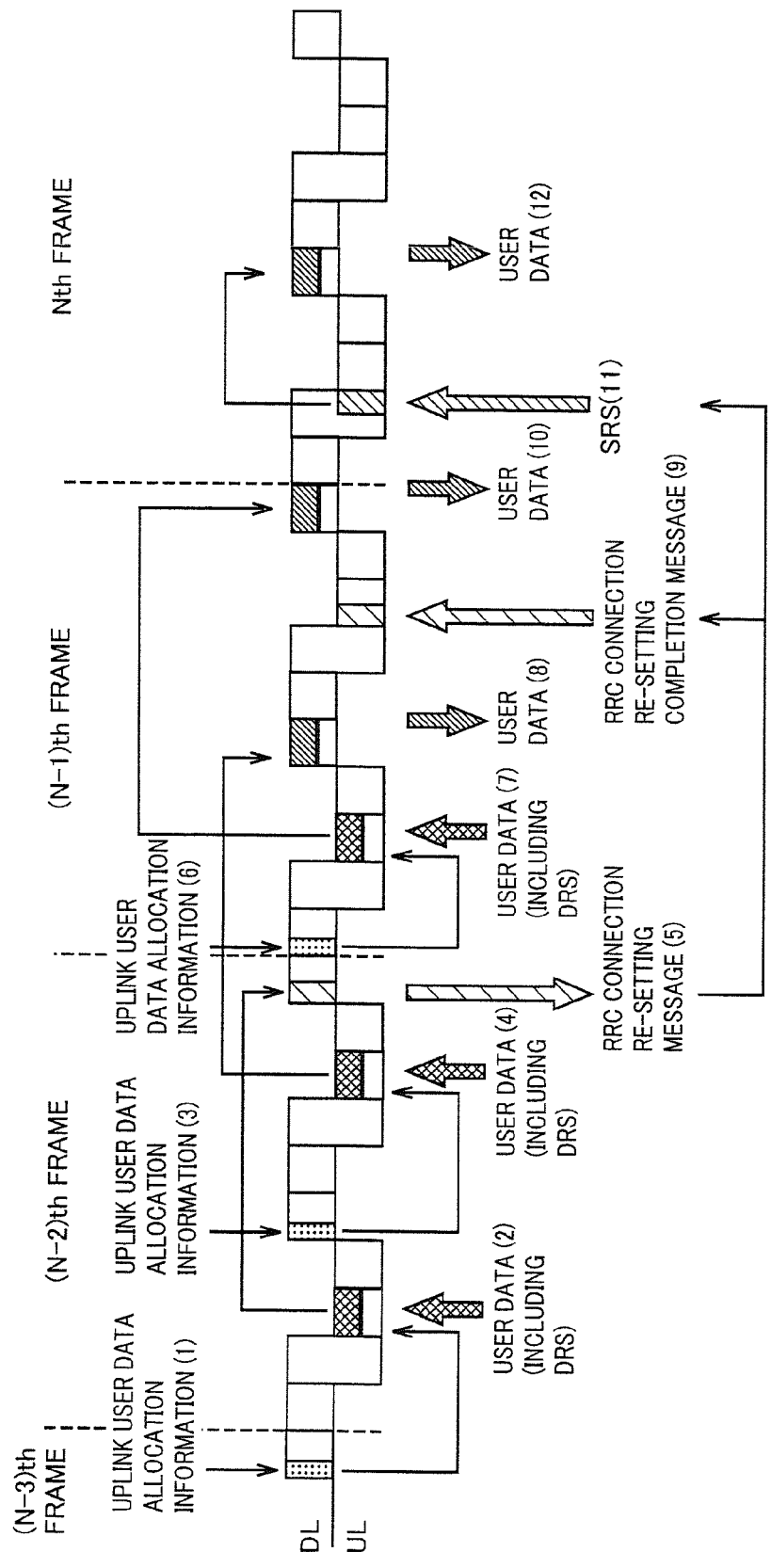
FIG. 5 is a diagram for illustrating timing in the embodiment.

FIG. 5 is a diagram for illustrating processing timing in the embodiment.

Referring to FIG. 5, initially, in an (N−3)th frame, wireless base station 1 determines a second resource from which an SRS is to periodically be transmitted in wireless terminal 51 which is a destination of downlink user data and determines a third resource for transmitting uplink user data including a DRS in wireless terminal 51. Wireless base station 1 transmits uplink user data allocation information representing the determined third resource (shown with (1)).

Wireless terminal 51 transmits in an (N–2)th frame, uplink user data including the DRS through the third resource of which notification has been given (shown with (2)).

Wireless base station 1 estimates a state of a transmission path to wireless terminal 51 based on the DRS received at (2). When the second resource from which an SRS is periodically transmitted in wireless terminal 51 which is the destination of downlink user data is determined, wireless base station 1 forms directivity of a plurality of antennas based on the estimated state of the transmission path and transmits an RRC connection re-setting (indicating start of transmission) message representing the determined second resource (shown with (5)). It is noted that an SRS transmission section is started as wireless terminal 51 transmits an RRC connection re-setting (indicating start of transmission) completion message (shown with (9)).

In the (N–2)th frame, wireless base station 1 determines a third resource for wireless terminal 51 to transmit uplink user data including a DRS and transmits uplink user data allocation information representing the determined third resource (shown with (3)). Wireless terminal 51 transmits uplink user data including the DRS by using the third resource of which notification has been given (shown with (4)).

Wireless base station 1 determines at least a part within downlink subframe DL as a first resource for transmitting downlink user data to a wireless terminal. Wireless base station 1 forms directivity of a plurality of antennas based on the state of the transmission path estimated based on the DRS received at (4) and transmits through the first resource, downlink user data and downlink user allocation information indicating that this first resource includes downlink user data (shown with (8)).

In an (N–1)th frame, wireless base station 1 determines a third resource for wireless terminal 51 to transmit uplink user data including a DRS and transmits uplink user data allocation information representing the determined third resource (shown with (6)). Wireless terminal 51 transmits uplink user data including the DRS by using the third resource of which notification has been given (shown with (7)).

Wireless base station 1 determines at least a part within downlink subframe DL as a first resource for transmitting downlink user data to a wireless terminal. Wireless base station 1 forms directivity of a plurality of antennas based on the state of the transmission path estimated based on the DRS received at (4) and transmits through the first resource, downlink user data and downlink user allocation information indicating that this first resource includes downlink user data (shown with (8)). Wireless terminal 51 transmits an RRC connection re-setting completion message (shown with (9)).

In the last subframe in the (N–1)th frame and first and second sub frames in an Nth frame, wireless base station 1 estimates a state of the transmission path to wireless terminal 51 based on the DRS received at (7). Wireless base station 1 forms directivity of the plurality of antennas based on the estimated state of the transmission path and transmits the downlink user data (shown with (10)).

In the Nth frame, wireless terminal 51 transmits an SRS through an UpPTS (shown with (11)). Wireless base station 1 estimates a state of the transmission path to wireless terminal 51 based on the received SRS. Wireless base station 1 forms directivity of the plurality of antennas based on the estimated state of the transmission path and transmits through the first resource, downlink user data and downlink user allocation information indicating that this first resource includes downlink user data (shown with (12)). In the SRS transmission section, transmission of an SRS (11) by wireless terminal 51 and transmission of downlink user data (12) based on the SRS by wireless base station 1 are repeated.

Operation Procedure

Figure 6:
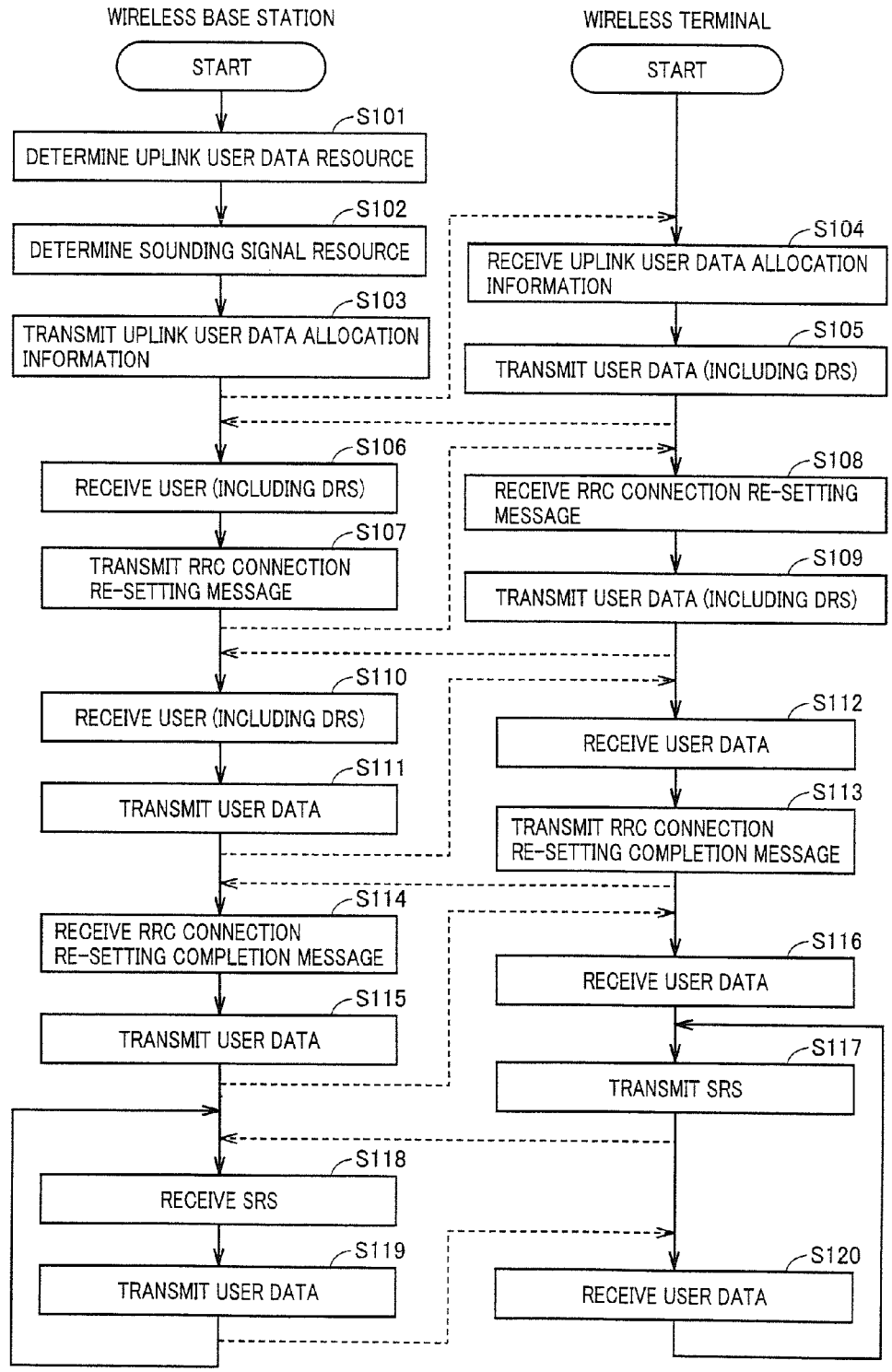
FIG. 6 is a flowchart showing an operation procedure in the wireless communication system in the embodiment.

FIG. 6 is a flowchart showing an operation procedure in the wireless communication system in the embodiment.

Referring to FIG. 6, initially, resource determination unit 7 of wireless base station 1 determines at least a part within any unlink subframe UL as a third resource for wireless terminal 51 to transmit uplink user data including a DRS (step S101). In addition, resource determination unit 7 of wireless base station 1 determines any resource within an UpPTS in switch subframe S as a second resource for wireless terminal 51 to periodically transmit an SRS (step S102).

Then, resource notification unit 8 of wireless base station 1 transmits uplink user data allocation information representing the determined third resource, as shown with (1) in FIG. 5 (step S103).

Then, user data control unit 57 of wireless terminal 51 receives the uplink user data allocation information representing the third resource (step S104).

Then, user data control unit 57 of wireless terminal 51 transmits the uplink user data including the DRS by using the third resource of which notification has been given in step S104, as shown with (2) in FIG. 5 (step S105).

Then, uplink user data control unit 10 of wireless base station 1 receives the uplink user data including the DRS (step S106).

Then, transmission path state estimation unit 9 of wireless base station 1 estimates a state of a transmission path to wireless terminal 51 based on the DRS received in step S106. Resource notification unit 8 of wireless base station 1 forms directivity of the plurality of antennas 2, 3 based on the estimated state of the transmission path and transmits an RRC connection re-setting message representing the determined second resource as shown with (5) in FIG. 5 (step S107).

Then, sounding signal control unit 58 of wireless terminal 51 receives the RRC connection re-setting message (step S108).

Then, user data control unit 57 of wireless terminal 51 transmits the uplink user data including the DRS by using the third resource of which notification has been given in step S104, as shown with (7) in FIG. 5 (step S109).

Then, uplink user data control unit 10 of wireless base station 1 receives the uplink user data including the DRS (step S110).

Then, resource determination unit 7 of wireless base station 1 determines at least a part within any downlink subframe DL as a first resource for transmitting downlink user data to wireless terminal 51. Transmission unit 4 of wireless base station 1 forms directivity of the plurality of antennas 2, 3 based on the state of the transmission path estimated based on the DRS received in step S106 and transmits through the first resource, downlink user data and downlink user data allocation information indicating that this first resource includes downlink user data as shown with (8) in FIG. 5 (step S111).

Then, reception unit 55 of wireless terminal 51 receives the downlink user data and the downlink user data allocation information through the plurality of antennas 52, 53 (step S112).

Then, sounding signal control unit 58 of wireless terminal 51 transmits an RRC connection re-setting completion message as shown with (9) in FIG. 5 (step S113).

Then, resource notification unit 8 of wireless base station 1 receives the RRC connection re-setting completion message (step S114).

Then, transmission path state estimation unit 9 of wireless base station 1 estimates a state of a transmission path to wireless terminal 51 based on the DRS received in step S110. Transmission unit 4 of wireless base station 1 forms directivity of the plurality of antennas 2, 3 based on the estimated state of the transmission path and transmits the downlink user data as shown with (10) in FIG. 5 (step S115).

Then, reception unit 55 of wireless terminal 51 receives the downlink user data through the plurality of antennas 52, 53 (step S116).

Then, sounding signal control unit 58 of wireless terminal 51 transmits an SRS by using the second resource of which notification has been given in step S108, as shown with (11) in FIG. 5 (step S117).

Then, SRS control unit 13 of wireless base station 1 receives the SRS (step S118).

Then, transmission path state estimation unit 9 of wireless base station 1 estimates a state of a transmission path to wireless terminal 51 based on the SRS received in step S118. Transmission unit 4 of wireless base station 1 forms directivity of the plurality of antennas 2, 3 based on the estimated state of the transmission path and transmits the downlink user data and the downlink user data allocation information as shown with (12) in FIG. 5 (step S119).

Then, reception unit 55 of wireless terminal 51 receives the downlink user data through the plurality of antennas 52, 53 (step S120).

As described above, according to the wireless communication system in the embodiment, a wireless base station determines a first resource for transmitting downlink user data, a second resource for receiving an SRS, and a third resource for receiving uplink user data including a DRS, and transmits a control message representing the second resource (RRC connection re-setting completion message) to a wireless terminal. Here, the wireless base station estimates a state of a transmission path by using a DRS included in received uplink user data as a sounding signal, forms directivity of a plurality of antennas based on the estimated state of the transmission path, and transmits a control message to a wireless terminal. Therefore, occurrence of an error in transmission and reception of the control message can be suppressed.

It is noted that, after the wireless base station receives an SRS, the wireless base station uses the received SRS as a sounding signal for estimating a state of a transmission path.

Thus, the wireless base station makes use of a DRS for transmission of a control message necessary for transmission of an SRS, whereas it makes use of an SRS for transmission of user data. Consequently, in a wireless communication system adapted to the LTE scheme, the smart antenna technique can effectively be utilized.

Variation of Embodiment

Figure 7:
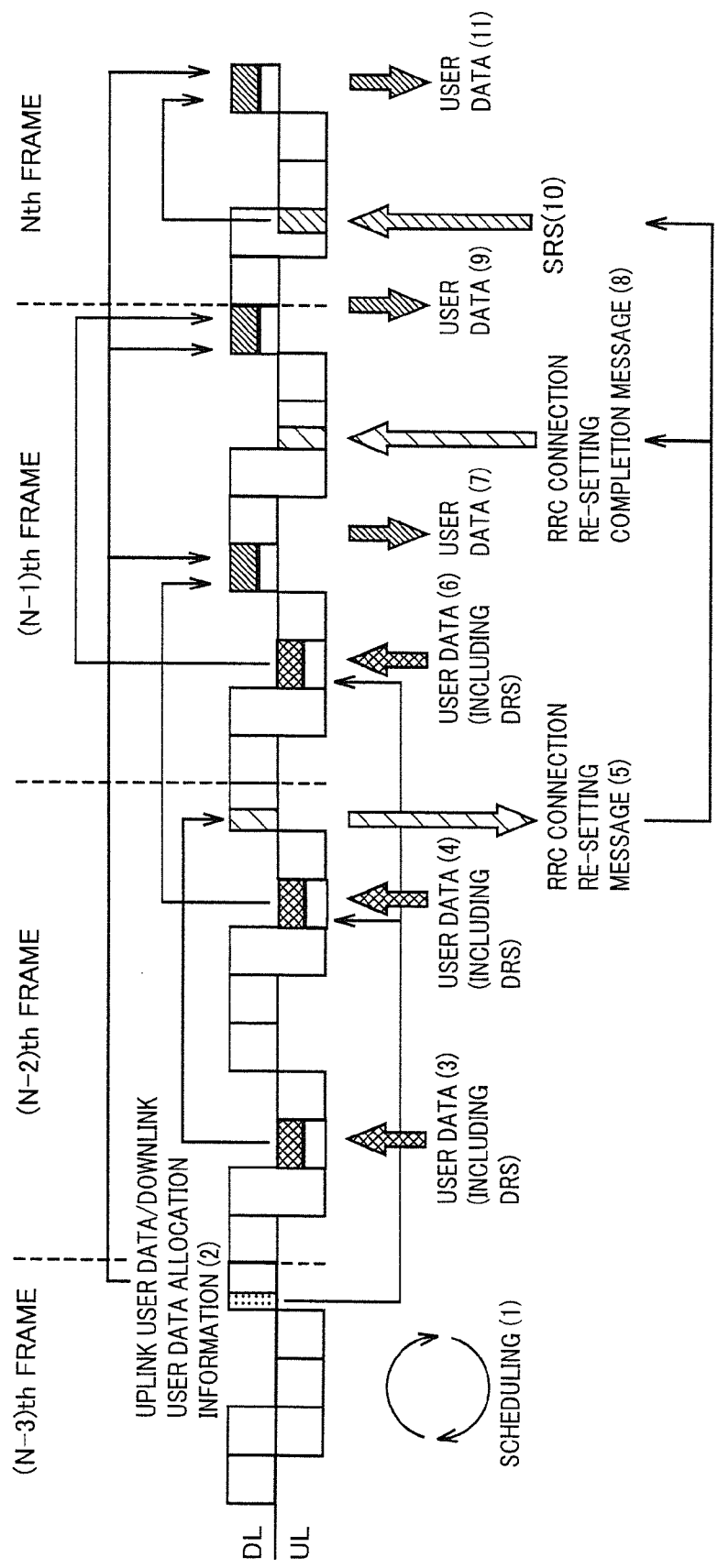
FIG. 7 is a diagram for illustrating processing timing in a variation of the embodiment.

FIG. 7 is a diagram for illustrating processing timing in a variation of the embodiment.

Processing shown in FIG. 7 is different from that in FIG. 5 as follows.

In FIG. 5, wireless base station 1 determines a first resource each timing before transmission of downlink user data, whereas in FIG. 7, wireless base station 1 periodically transmits the downlink user data by using the same first resource and determines this first resource only once in the beginning for transmission to wireless terminal 51.

Namely, as shown in FIG. 7, wireless base station 1 determines a first resource from which downlink user data is periodically transmitted (that is, with a half frame being defined as a cycle) in a prescribed downlink subframe DL and a subsequent subframe, a second resource from which an SRS is periodically transmitted (with a half frame being defined as a cycle) in wireless terminal 51 which is a destination of the downlink user data, and a third resource from which uplink user data including a DRS is to periodically be transmitted for a prescribed period (that is, only twice with a half frame being defined as a cycle) in wireless terminal 51 which is a destination of downlink user data (shown with (1)). Then, wireless base station 1 transmits uplink user data/downlink user data allocation information representing these determined first resource and third resource (shown with (2)).

Other processing in FIG. 7 is the same as that in FIG. 5.

Operation Procedure

FIG. 8 is a flowchart showing an operation procedure in a wireless communication system in a variation of the embodiment.

A procedure shown in FIG. 8 is different from the operation procedure in FIG. 6 as follows.

In FIG. 6, though resource determination unit 7 of wireless base station 1 determines a first resource and a second resource (steps S101, 102) and resource notification unit 8 of wireless base station 1 transmits uplink user data allocation information representing a determined third resource (step S103), in FIG. 8, resource determination unit 7 of wireless base station 1 determines a first resource, a second resource, and a third resource (steps S201, S202) and resource notification unit 8 of wireless base station 1 transmits uplink user data/downlink user data allocation information representing the determined first resource and third resource (step S203). It is noted that resource determination unit 7 of wireless base station 1 determines the first resource only once in the beginning and periodically transmits downlink user data through this first resource.

Variation

The present invention is not limited to the embodiment above, and also includes, for example, a variation as below.

(1) DRS

In the embodiment, it has been assumed that the wireless base station determines a third resource for receiving uplink user data including a DRS and notifies a wireless terminal of the determined third resource, however, the embodiment is not limited thereto. In the case where the wireless base station has already received uplink user data from that wireless terminal, the DRS included in the uplink user data can be used for estimation of a state of a transmission path, and therefore it is not necessary to newly determine a third resource.

(2) SRS

In the embodiment, the resource determination unit determines a part of an UpPTS (uplink part) within a switch subframe as a second resource for a wireless terminal to periodically transmit an SRS, however, the embodiment is not limited thereto.

For example, the resource determination unit may determine the entire UpPTS within the switch subframe as the second resource for the wireless terminal to periodically transmit an SRS.

Alternatively, the resource determination unit may determine a part within a switch subframe or of an uplink subframe (for example, a last symbol) as the second resource for the wireless terminal to periodically transmit an SRS.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

This invention can be applied to a wireless base station estimating a transmission path based on a reference signal.

REFERENCE SIGNS LIST 1 wireless base station; 2, 3, 52, 53 antenna; 4, 54 transmission unit; 5, 55 reception unit; 6, downlink user data control unit; 7 resource determination unit; 8 resource notification unit; 9 transmission path state estimation unit; 10 uplink user data control unit; 11 network communication unit; 12 network; 13 SRS control unit; 51 wireless terminal; 57 user data control unit and 58 sounding signal control unit.

The invention claimed is:

1. A wireless base station, comprising:
a resource determiner that determines at least a part within any downlink subframe as a first resource for transmitting downlink user data to a wireless terminal, determines at least a part of an uplink part within a switch subframe or a part of an uplink subframe as a second resource for said wireless terminal to periodically transmit a Sounding Reference Signal (SRS), and determines at least a part within any uplink subframe as a third resource for said wireless terminal to transmit uplink user data including a Demodulation Reference Signal (DRS) for a prescribed period;
a resource notifier that notifies said wireless terminal of said third resource; and
a transmission path state estimator,
wherein, prior to an SRS transmission section, the transmission path state estimator estimates a state of a transmission path to said wireless terminal based on said DRS included in received said uplink user data when the uplink user data including said DRS is received through said third resource from said wireless terminal, and said resource notifier forms directivity of an antenna based on said state of the transmission path, estimated based on said DRS, to transmit, through said first resource, a control message to initiate the SRS transmission section and notify said wireless terminal of said second resource for periodically transmitting said SRS, and wherein, during the SRS transmission section, the transmission path state estimator estimates a state of a transmission path, for forming directivity of an antenna to transmit the downlink user data to said wireless terminal through said first resource, based on an SRS received from said wireless terminal through said second resource.

2. The wireless base station according to claim 1, wherein said wireless base station is a wireless base station in a communication system adapted to an LTE (Long Term Evolution) scheme, and said uplink part is an UpPTS (Uplink Pilot Timeslot).

3. The wireless base station according to claim 2, wherein said resource determiner determines said first resource, said second resource, and said third resource in accordance with a frame configuration of which Uplink-downlink configuration is "1".

4. A wireless communication method, comprising:
determining at least a part within any downlink subframe as a first resource for transmitting downlink user data to a wireless terminal, determining at least a part of an uplink part within a switch subframe or a part of an uplink subframe as a second resource for said wireless terminal to periodically transmit a Sounding Reference Signal (SRS), and determining at least a part within any uplink subframe as a third resource for said wireless terminal to transmit uplink user data including a Demodulation Reference Signal (DRS) for a prescribed period;
notifying said wireless terminal of determined said third resource;
prior to an SRS transmission section, estimating a state of a transmission path to said wireless terminal based on said DRS included in received said uplink user data when the uplink user data including said DRS is received through said third resource from said wireless terminal, and forming directivity of an antenna based on said state of the transmission path, estimated based on said DRS, to transmit, through said first resource, a control message to initiate the SRS transmission section and notify said wireless terminal of said second resource for periodically transmitting said SRS; and,
during the SRS transmission section, estimating a state of a transmission path, for forming directivity of an antenna to transmit the downlink user data to said wireless terminal through said first resource, based on an SRS received from said wireless terminal through said second resource.

5. The method of claim 4, wherein said method is performed by a wireless base station in a communication system adapted to an LTE (Long Term Evolution) scheme, and said uplink part is an UpPTS (Uplink Pilot Timeslot).

6. The method of claim 5, wherein said first resource, said second resource, and said third resource are determined in accordance with a frame configuration of which Uplink-downlink configuration is "1".

* * * * *